US008108791B2

(12) United States Patent
Wang et al.

(10) Patent No.: US 8,108,791 B2
(45) Date of Patent: Jan. 31, 2012

(54) MULTI-SCREEN USER INTERFACE

(75) Inventors: Min Wang, Beijing (CN); Xiangwei Zhu, Beijing (CN); Haidong Zhang, Beijing (CN); Chunhui Zhang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 12/395,482

(22) Filed: Feb. 27, 2009

(65) Prior Publication Data
US 2010/0223574 A1   Sep. 2, 2010

(51) Int. Cl.
G06F 3/48 (2006.01)
(52) U.S. Cl. .................... 715/778; 715/206
(58) Field of Classification Search ............. 715/778, 715/277, 206, 501.1; 709/223; 707/1; 345/173
See application file for complete search history.

(56) References Cited

U.S. PATENT DOCUMENTS

| | | | |
|---|---|---|---|
| 5,289,574 A | 2/1994 | Sawyer | |
| 5,694,150 A | 12/1997 | Sigona et al. | |
| 5,777,615 A | 7/1998 | Barber et al. | |
| 6,879,331 B2 | 4/2005 | Cragun | |
| 7,010,755 B2 | 3/2006 | Anderson et al. | |
| 7,243,299 B1 * | 7/2007 | Rubin et al. | 715/209 |
| 7,861,166 B1 * | 12/2010 | Hendricks | 715/277 |
| 2003/0145075 A1 * | 7/2003 | Weaver et al. | 709/223 |
| 2004/0210847 A1 | 10/2004 | Berson et al. | |
| 2005/0071310 A1 * | 3/2005 | Eiron et al. | 707/1 |
| 2007/0109277 A1 * | 5/2007 | Lira | 345/173 |
| 2007/0283390 A1 | 12/2007 | Gordon et al. | |
| 2008/0163039 A1 * | 7/2008 | Ryan et al. | 715/206 |
| 2008/0295035 A1 | 11/2008 | Mattila et al. | |
| 2009/0007011 A1 * | 1/2009 | Czerwinski et al. | 715/810 |

OTHER PUBLICATIONS

"µC/GUI Multiple Layers/Displays: Micrium Embedded Graphical User Interface", retrieved on Dec. 5, 2008 at <<http://www.micrium.com/products/gui/multiplelayresdisplays.html>>, Micrium, pp. 1-5.
"Virtual Desk", retrieved on Dec. 5, 2008 at <<http://www.exefind.com/virtual-desk-P18077.html>>, JDSoft, pp. 1-2.

* cited by examiner

*Primary Examiner* — Chat Do
*Assistant Examiner* — Tuan S Nguyen
(74) *Attorney, Agent, or Firm* — Lee & Hayes, PLLC (57) ABSTRACT

A user interface and techniques for presenting content in a multiple virtual screens are described. The user interface has one or more multiple virtual screen to define separate and distinct portions of content data. Overview, related content information may be placed in the various multiple virtual screens. Navigation buttons facilitate movement from display of content information in one virtual screen to the display of content information in another virtual screen. With the bar navigation element, a user can intuitively move among the multiple virtual screens using just a single actuation (e.g., a single click of a mouse, or a stylus tap). The multiple virtual screens remain in their original orientation and relative positioning, and remain visible in the user interface so that the user can track their location.

15 Claims, 7 Drawing Sheets

MULTI-SCREEN USER INTERFACE

BACKGROUND

As computing power continues to grow, many of today's users demand more concurrent functionality from their computing devices and desiring the ability to view large volumes of information quickly. The large volumes of information overwhelm the current computer users. Furthermore, the complexity of relationships between different types of information has increased tremendously. In the existing paradigm of using graphical user interface (GUI) based operating systems, it is becoming increasingly difficult for users to browse and navigate through this huge amount of information in a single screen or a window with traditional approaches, like scrollbars and links. Traditional scrollbars enable users to continuously view content, even if the content does not fit into the space in a computer display, window, or viewport.

A problem with the existing scrollbars and links is relying on manual actions on the part of the user. With traditional scrollbars, the user manipulates the scrollbar to view the content using a vertical scrolling in the browser. With traditional links, the user clicks or activates a link to view additional information. These traditional techniques make it impractical to manage as manual manipulation can be labor intensive and may require an extraordinary amount of time to view large amounts of content.

These various techniques are desired to display the content information, since the practical display capability of a computer monitor is limited. In particular, a display of complex information may not be organized or organized well. Furthermore, the manner of presentations of complex information may affect the display, in not being very efficient or useful to the individuals. Therefore, it is desirable to find ways to view large amounts of content information in a multi-screen environment.

SUMMARY

A user interface and techniques for presenting complex information in multiple virtual screens are described. The user interface (UI) breaks down complex information in the multiple virtual screens to define separate and distinct portions of content information for viewing in each virtual screen. In one described implementation, for example, a user may browse the separate and distinct content information in a first virtual screen. Upon actuation of one or more navigation buttons, the user may browse the separate and distinct content information in a second virtual screen, while simultaneously no longer displaying the content information in the first virtual screen. With the bar navigation element, the user can intuitively move from one virtual screen to another virtual screen using a single actuation (e.g., a single click of a mouse, a keyboard, a finger, a stylus, or a screen tap).

Further, in certain implementations, the content information in the multiple virtual screens may be adjusted automatically in response to a change in the content information in a currently viewed or active virtual screen. After the multiple virtual screens adjust to the corresponding content information, the user can easily identify the level of the content information based on a title bar shown in the screen. The multi-screen UI fosters an intuitive and viewer friendly environment for viewing of large amounts of content information.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes a user interface and techniques for presenting subject matter on multiple virtual screens. Generally, the user interface allows content information (e.g., data, content, programs, browsers, charts, graphs, and the like) to be reorganized and displayed on multiple virtual screens based on a relationship of the information and in a hierarchical order for the information.

A user can browse among the multiple virtual screens by intuitively navigating through a single actuation event, such as a single mouse click or a touch screen tap from a stylus or a finger or a voice activation. The single actuation event is conducted with one or more navigation buttons, displayed on each virtual screen to allow the user to easily navigate among the virtual screens. For instance, a single navigation arrow may be used to indicate a direction to view the content information in another multiple virtual screen, a right arrow may define advancing to content that may be further ahead in relationship to the content information displayed on the current virtual screen, a left arrow may define reverting back to the content that may be prior information in relationship to the content information displayed on the current active virtual screen, and so on. Thus, the multiple virtual screens advance in response to a single actuation.

In one implementation, one or more navigation buttons facilitate movement to and from a first virtual screen to a second virtual screen in a horizontal order or a vertical order. Furthermore, there is a title bar to provide a visual cue that aids the user to identify an hierarchical organization of the separate and distinct portions of content information in each of the multiple virtual screens. The single actuation of the one or more navigation buttons will activate the next virtual screen for the user. Additionally, the one or more navigation buttons remain visible so that the user can easily track movement from one virtual screen to another virtual screen, quickly and promptly through the single actuation. The multi-screen user interface fosters an intuitive and viewer friendly environment for viewing of multiple virtual screens.

In another aspect, the content information may be adjusted automatically in response to the content information in a currently viewed virtual screen. For instance, content information running in one of the virtual screens may dedicate the other level of content information in the other virtual screens. In response, the multi-screen user interface adjusts the content information automatically to change the content information in the adjacent virtual screens to contain similar and related content information to enable the user to quickly view the content information in the multiple virtual screens.

While aspects of described techniques can be implemented in any number of different computing systems, environments, and/or configurations, embodiments are described in the context of the following exemplary computing environments.

Exemplary Computing Environment

Figure 1:
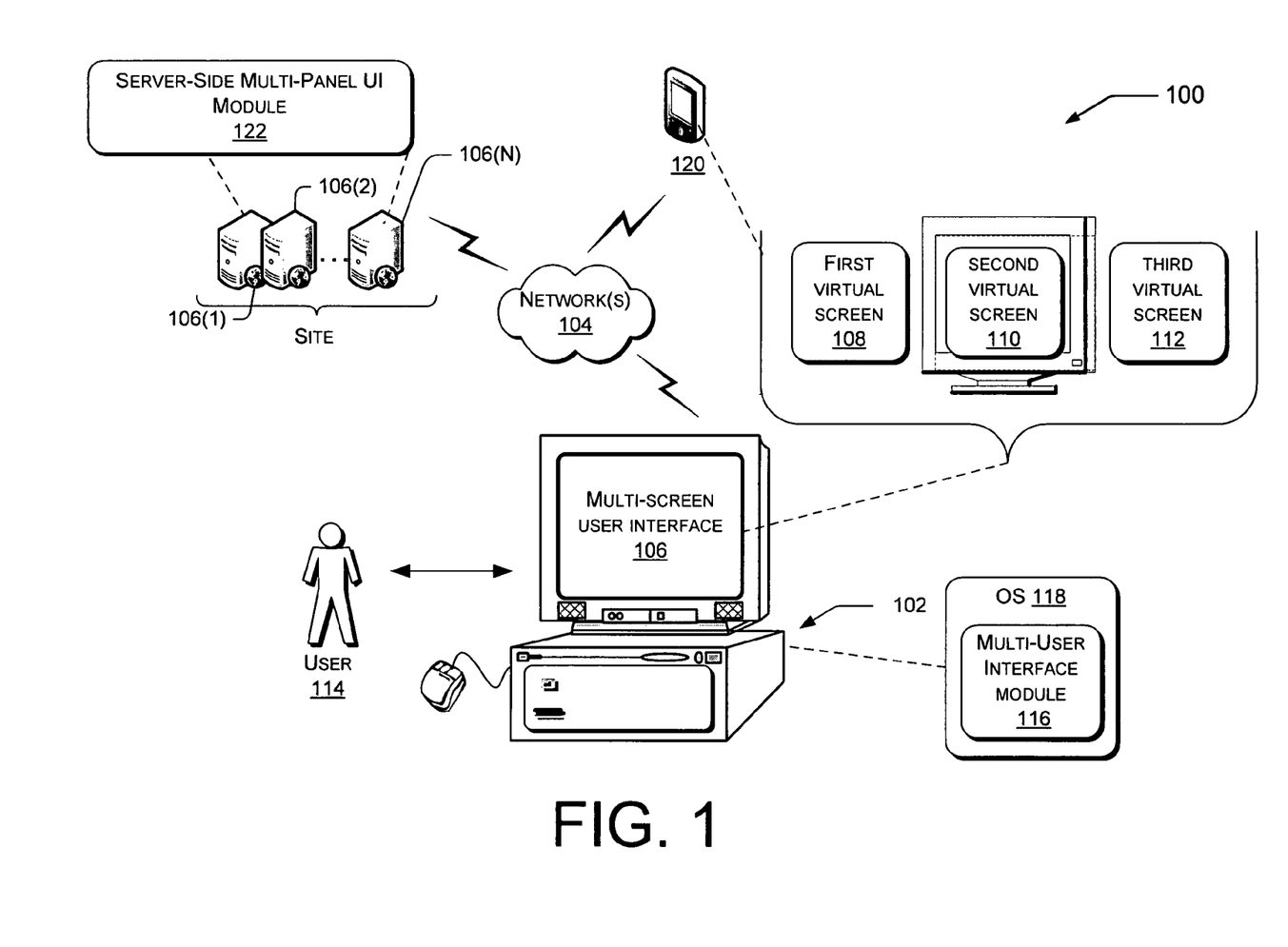
FIG. 1 illustrates an exemplary computing environment configured to present content information for a multi-screen user interface (UI).

FIG. 1 illustrates an exemplary computing environment 100 in which a multi-screen user interface (UI) and presentation techniques may be implemented. The exemplary computing environment improves the quality and user experience of large amounts of complex information by reorganizing the content information displayed in each of the multiple virtual screen displays. The exemplary computing environment 100 include an exemplary computing device that is configured to present content information using a multi-screen UI. In this illustrated example, the computing device illustrates a personal computer 102. Computing devices that are suitable for use with the environment 100, include, but are not limited to, a personal computer, a laptop computer, a desktop computer, a workstation computer, a personal digital assistance, a cellular phone, a smart phone, any other mobile or stationary computing device, and the like. The computing device 102 may be connected to one or more stored databases and various user terminals via a network, such as the internet represented by network 104, although certain computing devices (e.g., personal computer 102) may be operated as a standalone device without connection to a network.

The network 104 is representative of any one or combination of multiple different types of networks, interconnected with each other and functioning as a single large network (e.g., the Internet or an intranet). The network 104 may include wire-based networks (e.g., cable) and wireless networks (e.g., cellular, satellite, etc.). The network 104 may use any number of protocols and configurations to enable the computing device 102 to access other devices and resources.

A representative set of servers 106(1), 106(2), . . . , 106(N) is accessible via the network 104. The servers 106(1)-106(N) may be independent servers, or a collection of servers that are configured to perform larger scale functions (e.g., a server farm), or a set of servers configured to host one or more sites (e.g., websites) accessible by the network 104. In the illustrated example, the servers 106(1)-106(N) may represent private servers that serve content and programming to the computing device 102. Alternatively, the servers 106(1)-106(N) may represent a wireless services provider that provides content to wireless devices, such as portable handheld computing device. In still other implementations, the servers 106(1)-106(N) may be configured to host a site, such as a website accessible by anyone of the computing device 102 via the Internet 104.

These various arrangements exhibit examples of environments where a multi-screen UI may be employed. The computing device 102 may present a multi-screen UI 106 on a display screen. In a first example operating environment, the personal computer 102 presents a multi-screen UI 106 on a display, such as a CRT, flat LCD screen, or other display types. The multi-screen UI 106 consists of multiple virtual screens: a first virtual screen 108, a second virtual screen 110, and a third virtual screen 112. Content information that is related and along the same hierarchical order may be placed in the three separate and distinct multiple virtual screens, thereby providing a user 114 friendly layout of various items. The three multiple virtual screens 108, 110, 112 have one or more navigation button positioned in each virtual screen.

The multi-screen UI 106 is implemented as a module 116 as part of an operating system 118 that is stored and executed by the personal computer 102. A more detailed discussion of this example context is described below with reference to FIG. 2. The environment 100 may provide the multi-screen user interface 106 as, for example, but not limited to, a tool, a method, a solver, software, an application program, a service, technology resources which include access to the internet, and the like. Here, providing the multi-screen user interface is implemented as the multi-screen user interface module 116, part of an application program on the operating system 118.

In another implementation of exemplary operating environments, a portable computing device 120 presents another multi-screen UI on its touch sensitive screen. The multi-screen UI has multiple virtual screens; a first virtual screen and a second virtual screen. In this example, the multi-screen UI may be implemented as a software module executing on the device, or alternatively, as functionality served as part of the content delivered by the servers 106(1)-106(N). Thus, as described, a server-side multi-screen UI module 122 is executing at the servers 106(1)-106(N) to serve content to the portable computing device 120 with the UI functionality.

In yet another implementation of the exemplary operating environment, a thin client presents another version of a multi-screen UI that is depicted on a display, such as a CRT. Like the previous multiple screen user interface, the multiple screen user interface may include two or three multiple virtual screens. In this example, the navigation buttons may include arrows to move from one virtual screen to another. In this thin client context, the UI is supported by the server-side multi-screen UI module at the servers 106(1)-106(N).

Implementation of the multi-screen user interface 106 includes receiving content information submitted or given by the user 114. The content information may be defined into separate and distinct portions and reorganized into each of the multiple virtual screens. The content information typically demonstrate a relationship between the content information in each of the multiple virtual screens.

Illustrative Process for Multi-Screen

Figure 2:
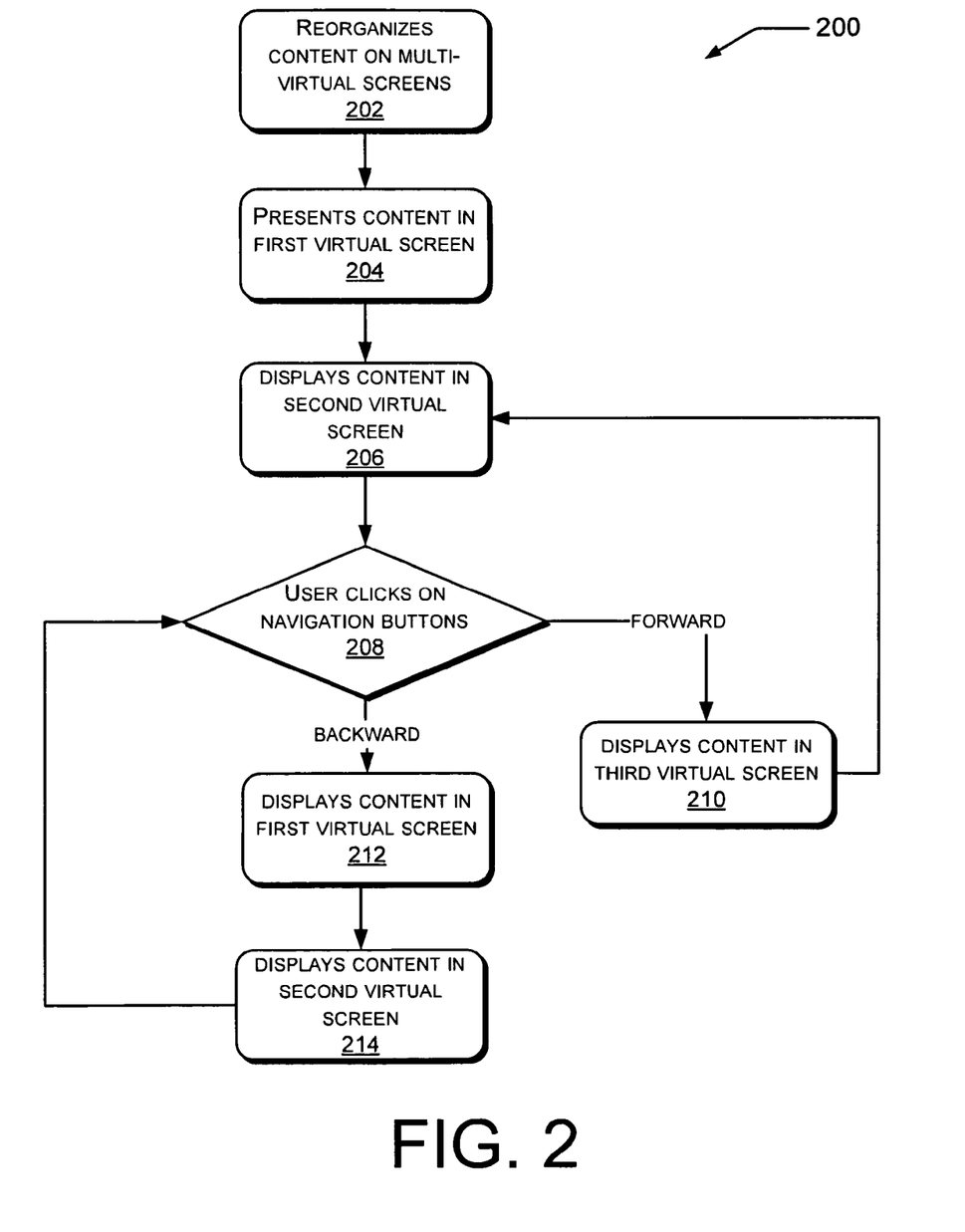
FIG. 2 is an overview flow diagram illustrating an exemplary process for presenting content information in a multi-screen UI on multiple virtual screens.

Illustrated in FIG. 2 is an overview exemplary flowchart of a process 200 for implementing the multi-screen user interface 106. There are many benefits to users by displaying the content information on multiple virtual screens and enabling the user to manage context information between the multiple virtual screens based on input of the user. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an example of the multi-screen user interface 106 of FIG. 1. The process is a navigation/UI metaphor that exaggerates the operating screen space available to users beyond a border of the actual hardware screen, making it possible to view complex information on a much bigger and flexible "virtual" space. In some implementations, there may only be two virtual screens, while in other implementations, there are three virtual screens.

Starting at block 202, represents a multi-screen user interface 106 with reorganizing context information for the multiple virtual screens that has been submitted from the user 114. The context information is defined into separate and distinct portions for each of the multiple virtual screens, which can hold overview information, data, charts, graphs, and the like. The process 200 reorganizes and relocates the context information 202 into the multi-screen environment, which addresses the content-screen space conflict, but also helps to better present the increasingly complex information to the user 114.

Block 204 represents displaying the content information in the first virtual screen. When the content information is being displayed to the user 114, the virtual screen is considered an active or a current virtual screen. The content information may be organized in the hierarchical order with different layers of information. In this implementation, the content information consists of an overview shown in the first virtual screen, related information to the overview is shown in the second virtual screen, and more related details to the overview is shown in the third virtual screen. With the overview provided in the first virtual screen, the user 114 is conscious of the content information available for viewing in the second and third virtual screens.

The first virtual screen is typically the initial virtual screen displayed to the user 114. The user 114 sees the content information in the first virtual screen and may decide to browse content information in the second virtual screen by using the single actuation on the navigation buttons to slide the content information from the second virtual screen. Simultaneously, the content information in the first virtual screen is no longer displayed when the content information in the second virtual screen is displayed.

Block 206 represents displaying the content information in the second virtual screen. Shown in the second virtual screen is content information, which is related information to the overview information in the first virtual screen. At this time shown in the process, the current or active virtual screen is the second virtual screen.

Block 208 represents a decision point for the user 114. The active or current screen is the second virtual screen. Here, the user 114 views the content information in the second virtual screen and is mentally aware or conscious of the content information that is available in the first virtual screen and has an idea based on the overview, of content information that is available in the third virtual screen.

If the user 114 decides to navigate forward to the third virtual screen, the process travels to the right of the decision block 208 to block 210. At block 210, the user 114 views content information in the third virtual screen. Simultaneously, the content information in the second virtual screen is no longer displayed when the content information in the third virtual screen 210 is displayed. However, the user 114 may decide to no longer browse the content information in the third virtual screen, but to browse content in the second virtual screen. The user 114 then clicks on the single actuation on the navigation buttons to slide the content information from the second virtual screen, as shown on the right side to block 206.

Returning to block 208 which has the second virtual screen as the active view. If the user 114 decides to view content information in the first virtual screen, the process 200 proceeds to move to the first virtual screen 212. The process moves along the 'backward' line to block 212, which is display of the content information in the first virtual screen. This may be considered viewing prior information or overview information in the first virtual screen. From the first virtual screen 212, the user 114 may advance to the second virtual screen 214.

Block 214 illustrates display of the content information in the second virtual screen. The user 114 may make two decisions when the second virtual screen is the active virtual screen. As shown, the process moves back to block 208 and starts all over again.

Multi-Screen UI Examples

Figure 3:
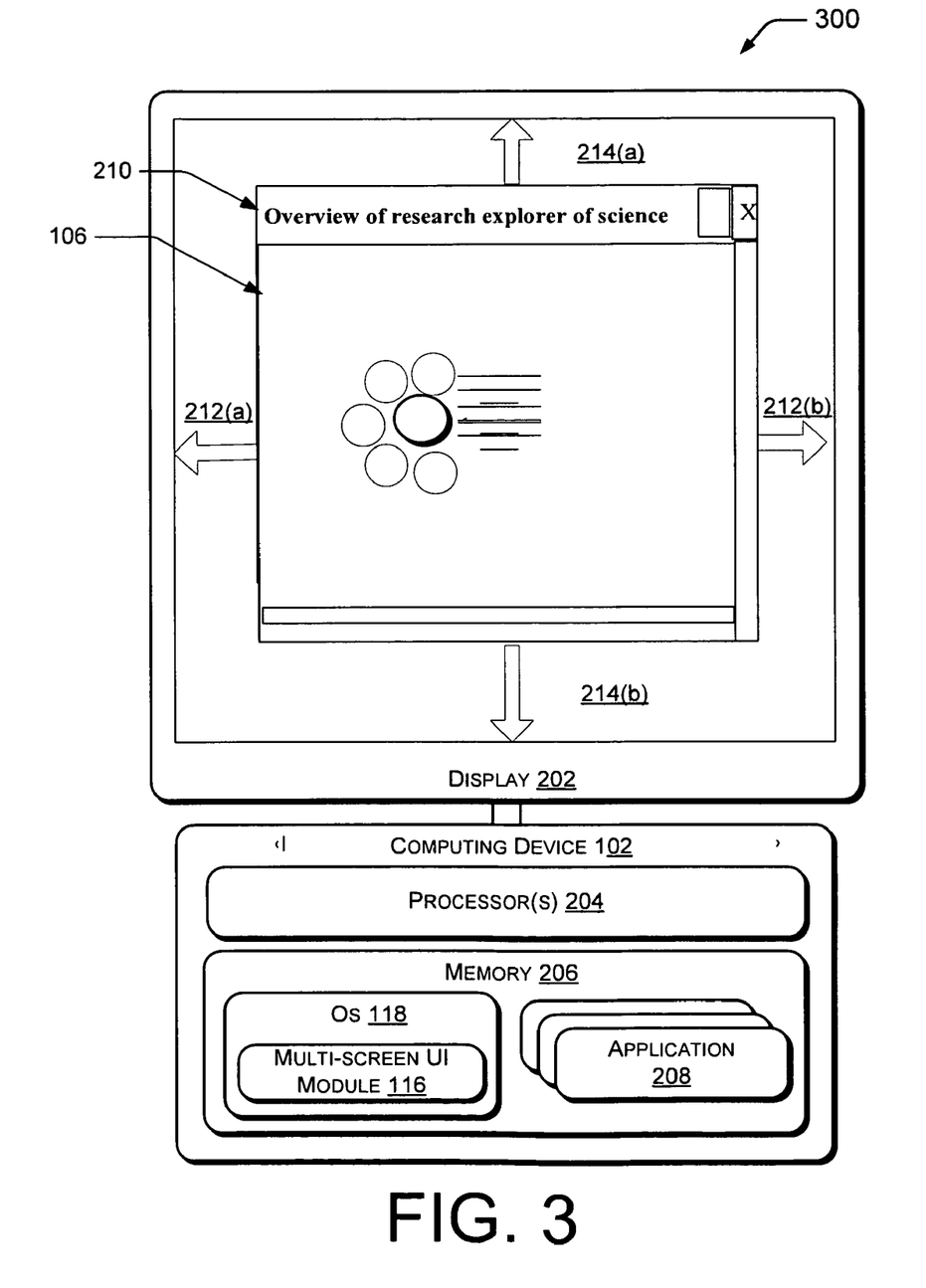
FIG. 3 is a block diagram of the exemplary computing device in FIG. 1, and illustrates an exemplary virtual screen in more detail.

FIG. 3 shows a more detailed system 300 in which the multi-screen UI 106 is implemented. The system 300 is embodied as a computing device 102 that presents the multi-screen UI 106 on a display 202. The computing device 102 may be representative of any number of devices, including, for example, a personal computer, portable computer, communication device, entertainment device, and the like. The computing device 102 has a processor 204 and a memory 206. The memory 206 includes computer-readable media in the form of volatile memory, such as Random Access Memory (RAM) and/or non-volatile memory, such as Read Only Memory (ROM) or flash RAM. In FIG. 3, the memory 206 stores the operating system 118 and one or more application programs 208 that are accessible by and executable on the processor 204. The memory 206 may further store various forms of content.

The multi-screen UI module 116 is shown as part of the OS 118 in the FIG. 3 implementation. When executed by the processor 204, the UI module 116 presents the multi-screen UI 106 on the display 202. In this example, the UI 106 covers all available screen area of the display 202, although in other embodiments, it may be configured to cover less than the entire screen area. The multi-screen UI 106 has multiple virtual screens, at least three in this implementation. The content information in each multiple virtual screen define separate and distinct portions of content on the virtual screens. The various forms of subject matter are presented in a viewer friendly layout, with non-overlapping multiple virtual screens that allow the user to see all the subject matter in different virtual screens or focus on particular virtual screens, more specifically.

The multi-screen UI 106 further includes a title bar 210 shown in the top of the browser in the display 202. The title bar 210 provides visual cues to aid the users in navigating among the different multiple virtual screens. In the illustrated example, the title bar 210 is in the "overview area of research explorer of science", which is typically the first virtual screen.

FIG. 3 shows an example where different navigation buttons may appear on the multi-screen UI 106, and is shown in four different locations of the multi-screen UI 106. The four navigation buttons do not appear all at one time, but are illustrations of the possible locations for the navigation buttons, such as residing in a home position. FIG. 3 illustrates the one or more navigation buttons being actutable to facilitate movement among the multiple virtual screens including at least one of a right direction, a left direction, an upward direction, or a downward direction, as indicated by the direction of the arrow or pointer.

For example, if the content information is to be viewed horizontally, the navigation buttons would be located on the multi-screen UI 106 at left 212(*a*) or right 212(*b*). As mentioned in FIG. 2, it would depend on whether the user 114 desired to proceed forward or backward in the content information relationship. In another implementation, if the content information is to be viewed vertically, the navigation buttons would be located on the multi-screen UI 106 at the top 214(*a*) or the bottom 214(*b*). As mentioned in FIG. 2, it would depend on whether the user 114 desired to proceed forward or backward in the content information relationship. The user can select the navigation button to and from the different virtual screens. In this way, the user can easily move from virtual screen to virtual screen without having to open and track numerous independent interfaces. It is noted that while four navigation buttons, as arrows are shown in this example, any number of combinations of any type of navigation buttons or bars or pointers may be used.

A single actuation including a pointer, a stylus, a finger, a screen tap, or a voice activation may be used to activate the navigation buttons to move from viewing content information in one virtual screen to viewing content information in another virtual screen. If the user actuates the navigation button 212(*b*) (e.g., single mouse click, stylus or finger tap a double click, or hovering a pointer over the actuatable navigational buttons for a predetermined period of time), the content information in the current first virtual screen on display is no longer on display, while the content information in the second virtual screen slides into the place of the first virtual screen on the display 202. Accordingly, the multi-screen UI 106 provides an intuitive navigation control that is easy to use with minimal control tasks. The illustration is an example of the title bar, of the navigation bars, and not to scale of the content information that will be on display in the virtual screen environment.

Figure 4A:
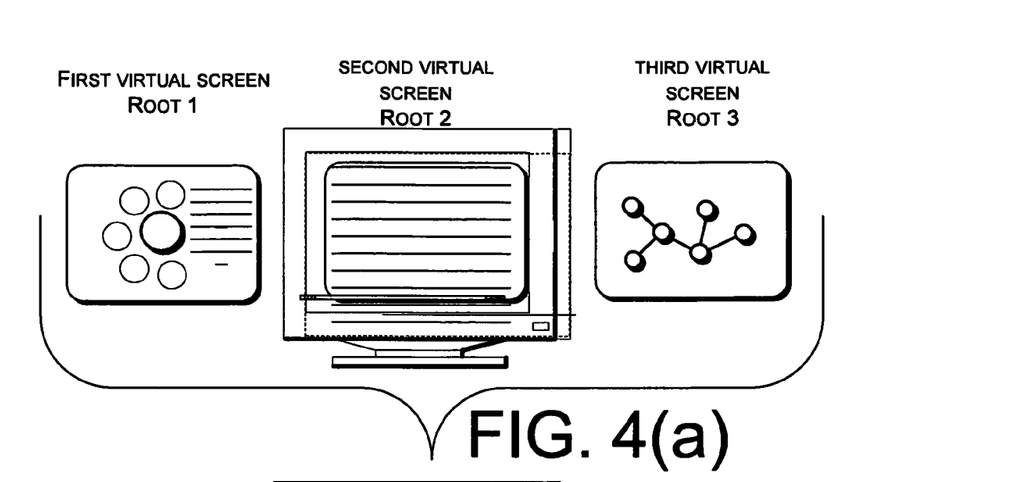
FIGS. 4(a)-(c) illustrate a block diagram of an exemplary process for reorganizing the content information in different layers for the multiple virtual screens.
Figure 4B:
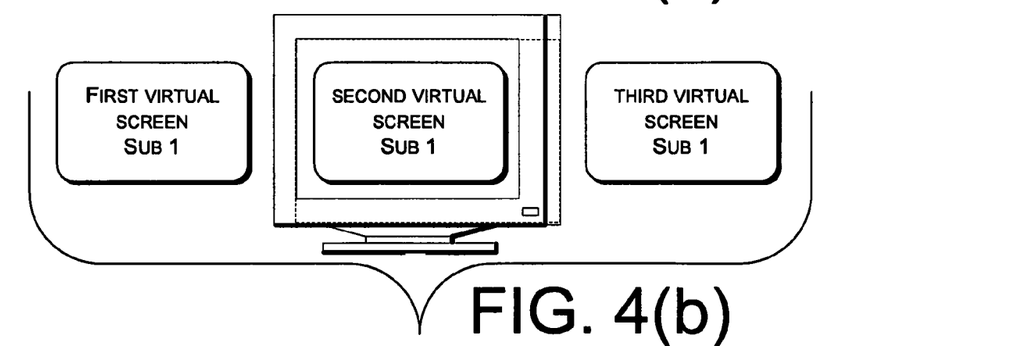
Figure 4C:
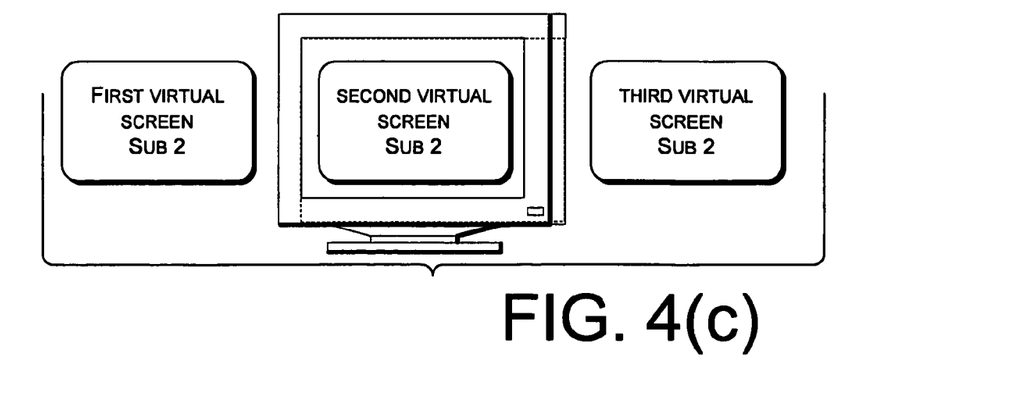

FIGS. 4(*a*)-(*c*) illustrate the content information displayed in the hierarchical order, when the content information contains a grid of screens. FIG. 4(*a*) shows an example set of content information reorganized and distributed at one level across the multiple virtual screens in the horizon manner. For example, shown in the top row, the first virtual screen has overview content information in the parent-root level, and the content information in the second and third virtual screens have related information to the overview content information in the first virtual screen. The content information in the second and third virtual screens are also at the same level, as the information in the first virtual screen, at the parent-root levels.

In some implementations, the multi-screen user interface 106 automatically adjusts the content information in each of the multiple virtual screens in response, to the content information in a currently viewed virtual screen. For example, if the user is viewing information in the parent-root level in the first virtual screen, the content information in the second and third virtual screens are also at the parent-root levels.

FIG. 4(*b*) shows an example set of content information that would be available in another level of the multiple virtual screens. The example set contains content information related with the corresponding screens of the parent-root levels in FIG. 4(*a*). Shown are sub-level 1 in the first virtual screen, sub-level 1 in the second virtual screen, and sub-level 1 in the third virtual screen. The user 114 can directly navigate to specific sub-level virtual screens in a column through the parent root-level or browse through the multiple virtual screens by using the navigation buttons located on the top 214(*a*) or bottom 214(*b*) of the multi-screen user interface 106 for vertically viewing.

FIG. 4(*c*) shows an example set of content information that would be available in another level of the multiple virtual screens. The example set contains content information related with the corresponding screens of the parent-root levels in FIG. 4(*a*) and with the sub-levels in FIG. 4(*b*). Shown are sub-level 2 in the first virtual screen, sub-level 2 in the second virtual screen, and sub-level 2 in the third virtual screen. The user 114 can directly navigate to the specific sub-level in the virtual screens in a column through the parent root-level/sub-level 1 or browse through the multiple virtual screens by using the navigation buttons located on the top 214(*a*) or bottom 214(*b*) of the multi-screen user interface 106 for vertically viewing. Shown is an implementation with a parent-root level and two sub-levels.

FIGS. 4(*a*)-(*c*) illustrate facilitating forward and backward movements from the first virtual screen to the second virtual screen in response to a single actuation; and facilitating forward and backward movements from the second virtual screen to the third virtual screen in response to a single actuation. There may be additional sub-levels that may be used to display the content information in the multiple virtual screens.

Multi-Screen UI Navigation Examples—Horizon

Figure 5A:
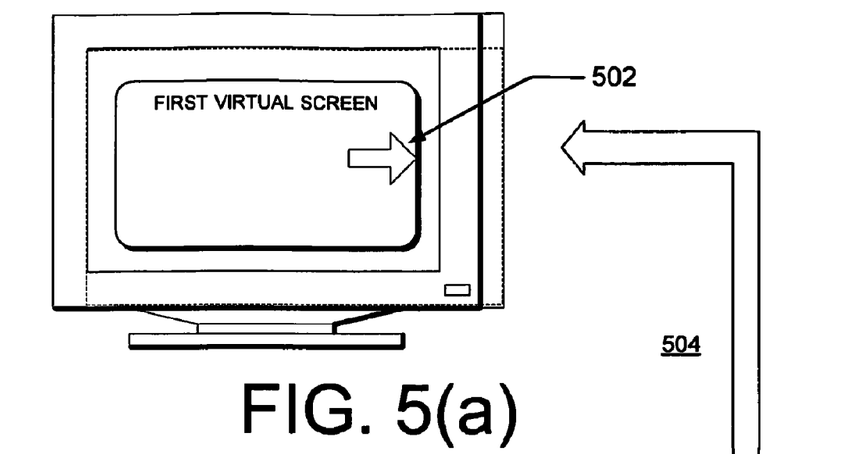
FIGS. 5(a)-(c) illustrates a set of exemplary navigation commands for the multi-screen user interface, when the content information is displayed in a horizontal order. These figures demonstrate how the screens are displayed in response to the navigation commands.
Figure 5B:
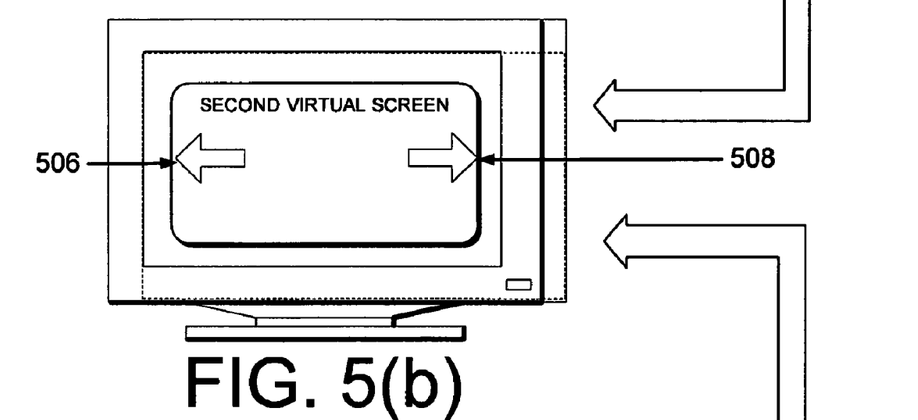
Figure 5C:
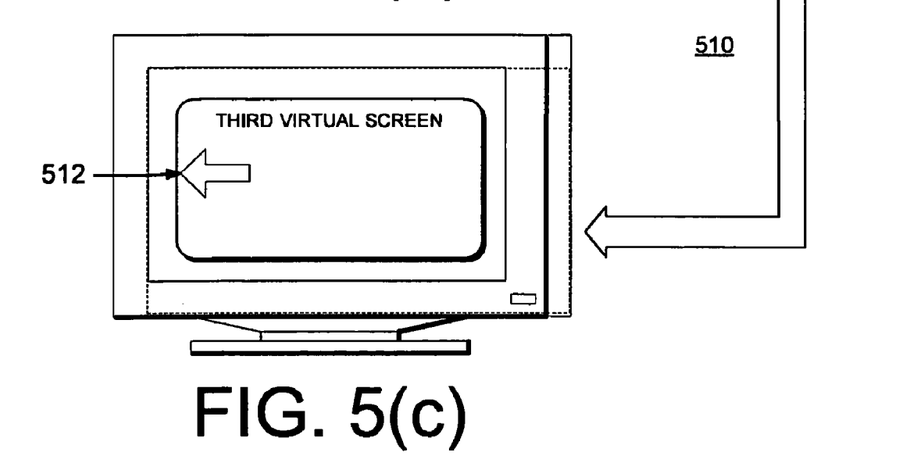

FIGS. 5(*a*)-(*c*) illustrate the navigation commands for navigating content information in one virtual screen to content information displayed in another virtual screen. The illustrations in FIGS. 5(*a*)-5(*c*) are for content information that is displayed horizontally in the multiple virtual screens. FIGS. 5(*a*)-(*c*) illustrate one or more navigation buttons being placed in a right side or a left side in each of the multiple virtual screens. The one or more navigation buttons are actutable to browse the separate and distinct portions of content information in each of the multiple virtual screens in a horizontal order.

FIG. 5(*a*) shows content information that would be displayed in the first virtual screen. Shown in the multi-screen user interface 106 of FIG. 5(*a*) is a navigation arrow 502 to the right. The navigation arrow 502 indicates the user may proceed to content information that is located to the right side of the content information in the first virtual screen or to related information to the content information in the first virtual screen. At the right side, is a bidirectional arrow 504, which indicates when the user 114 clicks on the arrow 502, the content information from the second virtual screen is shown in the multi-user interface 106, while the content information in the first virtual screen is no longer being shown. The position of the navigation button 502 and direction of its interior arrow are intended to convey which content information will be displayed upon actuation of the navigation button for horizontally viewing. Moreover, single actuation of the button when the arrow 502 is visible causes the virtual screen to reposition to a preset position.

FIG. 5(*b*) shows content information that would be displayed in the second virtual screen. Shown in the multi-screen user interface 106 of FIG. 5(*b*) is a navigation arrow pointing to the left 506 and the navigation arrow pointing to the right 508. The navigation arrow 506, 508 indicates the user may proceed to content information that is located to the left or right side of the second virtual screen or to related information to the content information in the second virtual screen. At the right side, are bidirectional arrows 504, 510, which indicate when the user 114 clicks on the arrow pointing to the left side 506, the content information from the first virtual screen is shown in the multi-user interface 106, while the content information in the second virtual screen is no longer being shown. In another illustration, when the user 114 clicks on the arrow pointing to the right side 508, the content information from the third virtual screen is shown in the multi-screen user interface 106, while no longer displaying the content information in the second virtual screen. The position of the navigation buttons and direction of its interior arrows are intended to convey which content information will be displayed upon actuation of the navigation buttons. Moreover, single actuation of the buttons when the arrows 506, 508 are visible cause the virtual screens to reposition to preset positions.

FIG. 5(*c*) shows content information that would be displayed in the third virtual screen. Shown in the multi-screen user interface 106 of FIG. 5(*c*) is a navigation arrow pointing to the left 512. The navigation arrow 512 indicates the user may proceed to content information that is located to the left side of the third virtual screen or related information to the content information in the third virtual screen. At the right side, is a bidirectional arrow 510, which indicates when the user 114 clicks on the arrow pointing to the left side 512, the content information from the second virtual screen is shown in the multi-user interface 106, while the content information in the third virtual screen is no longer being shown. The position of the navigation buttons and direction of its interior arrows are intended to convey which content information will be displayed upon actuation of the navigation buttons. Moreover, single actuation of the button when the arrow 512 is visible cause the virtual screen to reposition to a preset position.

Multi-Screen UI Navigation Examples—Vertical

Figure 6A:
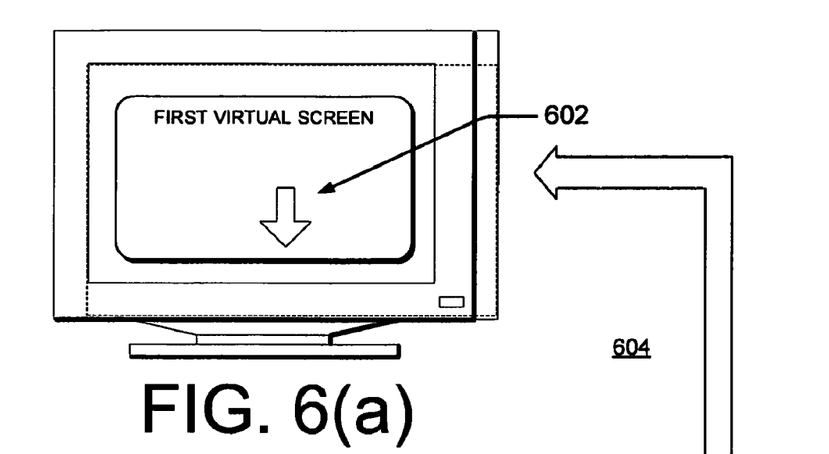
FIGS. 6(a)-(c) illustrates a set of exemplary navigation commands for the multi-screen user interface, when the content information is displayed in a vertical order. These figures demonstrate how the screens are displayed in response to the navigation commands.
Figure 6B:
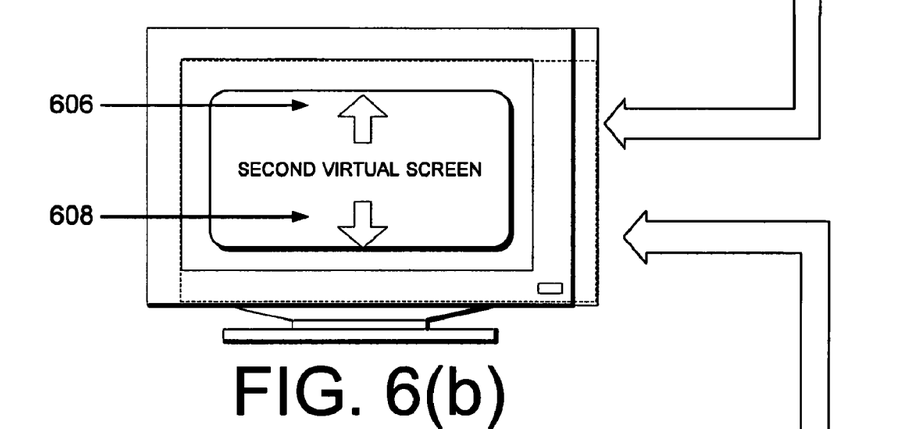
Figure 6C:
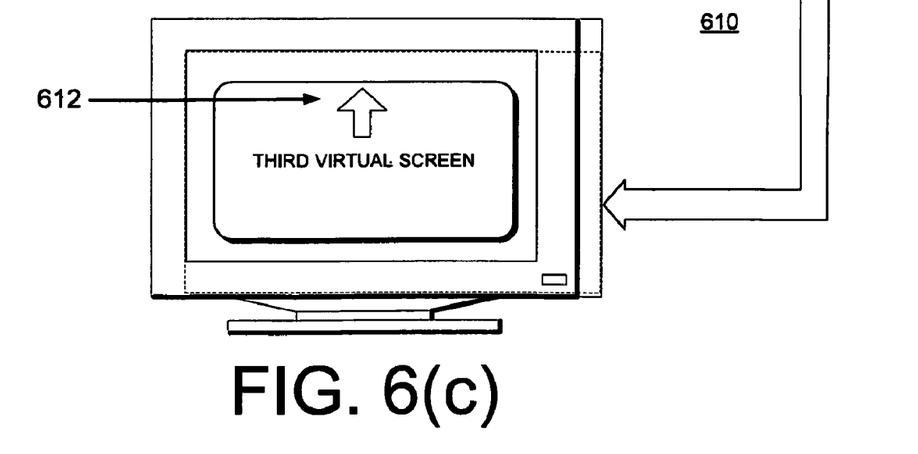

FIGS. 6(*a*)-(*c*) show another example implementation for navigating a multi-screen UI, for navigating content information in one virtual screen to content information displayed in another virtual screen. The illustrations in FIGS. 6(*a*)-6(*c*) are for content information that is displayed vertically in the multiple virtual screens. Shown in FIGS. 6(*a*)-(*c*) are one or more navigation buttons being placed in a top location or a bottom location in each of the multiple virtual screens, where the one or more navigation buttons are actuatable to browse the separate and distinct portions of content information in each of the multiple virtual screens in a vertical order.

FIG. 6(*a*) shows content information that would be displayed in the first virtual screen. Shown in the multi-screen user interface 106 of FIG. 6(*a*) is a navigation arrow 602 pointing towards the bottom direction of the multi-screen user interface 106. The navigation arrow 602 indicates the user 114 may proceed to content information that is located to the bottom of the content information in the first virtual screen or to related information to the content information in the first virtual screen. At the right side, is an bidirectional arrow 604, which indicates when the user 114 clicks on the arrow 602, the content information from the second virtual screen is shown in the multi-user interface 106, while the content information in the first virtual screen is no longer being shown. The position of the navigation button 602 and direction of its interior arrow are intended to convey which content information will be displayed upon actuation of the navigation button. Moreover, single actuation of the button when the arrow 602 is visible causes the virtual screens to reposition to a preset position.

FIG. 6(*b*) shows content information that would be displayed in the second virtual screen. Shown in the multi-screen user interface 106 of FIG. 6(*b*) is a navigation arrow pointing to the top 606 and the navigation arrow pointing to the bottom 608 in the second virtual screen. The navigation arrows 606, 608 indicate the user may proceed to content information that is located to top or the bottom of the content information in the second virtual screen or related information to the content information in the second virtual screen. At the right side, are bidirectional arrows 604, 610, which indicate when the user 114 clicks on the arrow pointing to the top direction, the content information from the first virtual screen is shown in the multi-user interface 106, while the content information in the second virtual screen is no longer being shown. In another illustration, when the user 114 clicks on the arrow pointing to the bottom direction 608, the content information from the third virtual screen is shown in the multi-screen user interface 106, while no longer displaying the content information in the second virtual screen. The position of the navigation buttons and direction of its interior arrows are intended to convey which content information will be displayed upon actuation of the navigation buttons. Moreover, single actuation of the buttons when the arrows 606, 608 are visible cause the virtual screens to reposition to a preset position.

FIG. 6(*c*) shows content information that would be displayed in the third virtual screen. Shown in the multi-screen user interface 106 of FIG. 6(*c*) is a navigation arrow pointing to the top direction 612. The navigation arrow 612 indicates the user may proceed to content information that is located to the top of the third virtual screen or to related content information to the third virtual screen. At the right side, is a bidirectional arrow 610, which indicates when the user 114 clicks on the arrow pointing to the top direction 612, the content information from the second virtual screen is shown in the multi-user interface 106, while the content information in the third virtual screen is no longer being shown. The position of the navigation buttons and direction of its interior arrows are intended to convey which content information will be displayed upon actuation of the navigation buttons. Moreover, single actuation of the button when the arrow 612 is visible cause the virtual screen to reposition to a preset position.

The multi-screen UI significantly reduces the operational overhead for users. Using a single actuation (e.g., single mouse click), the user can adjust the content information in any of the multiple virtual screens. Unlike windowing environments where the user performs multiple actuations to identify, move, and arrange individual pane interfaces on a screen, the multi-screen UI effectively enlarges certain workspace on the screen of current focus for the user, without losing track or visibility of that other workspace. The multiple virtual screen implementation is managed through a single actuation of a navigation element.

Now, suppose the user wants to return the layout to its original, home state. As represented by flow arrow 612, the user clicks on the navigation arrow 612 to move from the third virtual screen to the second virtual screen. Then the user clicks on the flow arrow 606 to move from the second virtual screen to the first virtual screen. In response, the title bar appears at the top of the browser to inform the user of the navigation action to return to the home position.

Multi-Screen UI System

Figure 7:
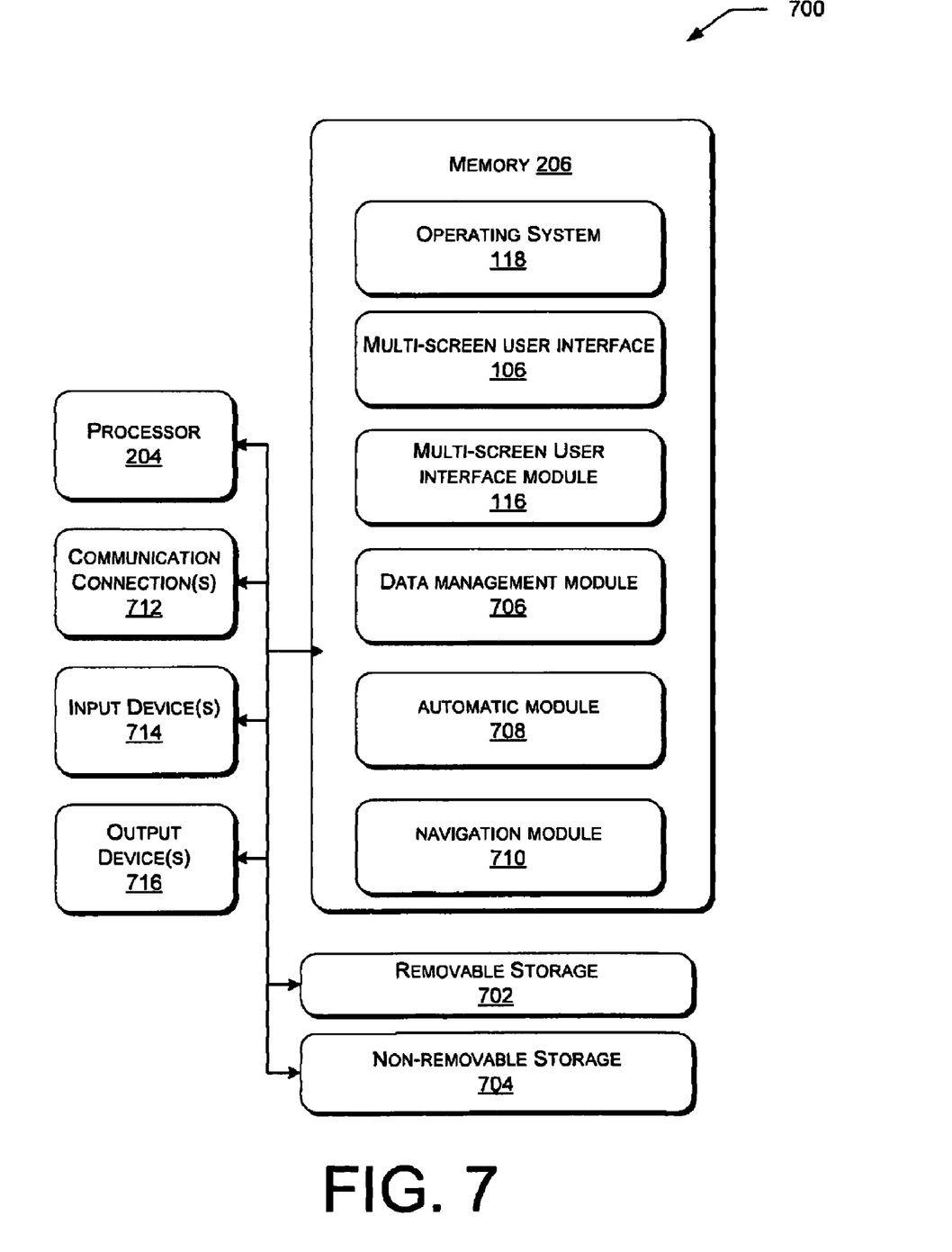
FIG. 7 illustrates a block diagram showing an exemplary computing system configured to present the content information for the multi-screen user interface (UI).

FIG. 7 is a schematic block diagram of an exemplary general operating system 700. The system 700 may be configured as any suitable system capable of implementing the multi-screen user interface 106. In one exemplary configuration, the system comprises at least one processor 204 and memory 206. The processing unit 204 may be implemented as appropriate in hardware, software, firmware, or combinations thereof. Software or firmware implementations of the processing unit 204 may include computer- or machine-executable instructions written in any suitable programming language to perform the various functions described.

Memory 206 may store programs of instructions that are loadable and executable on the processor 204, as well as data generated during the execution of these programs. Depending on the configuration and type of computing device, memory 206 may be volatile (such as RAM) and/or non-volatile (such as ROM, flash memory, etc.). The system may also include additional removable storage 702 and/or non-removable storage 704 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 206 in more detail, may include an operating system 118, one or more additional query search application program 106 for implementing all or a part of the additional relevant query search method. For example, the system 700 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 206 includes the multi-screen user interface 106 including the multi-screen user interface module 116, a data management module 706, an automatic module 708, and a navigation module 710. The multi-screen user interface 106 displays to the user a graphical user interface for the multiple virtual screens. The user interface also displays the title bar to the user. The data management module 706 stores and manages storage of information, and the like, and may communicate with one or more local and/or remote databases or services. The automatic module 708 allows the process to operate without human intervention, such as automatically adjusting the content information in each multiple virtual screens. The navigation module 710 interacts with the user interface module 116 to move among the multiple virtual screens.

Memory 206, removable storage 702, and non-removable storage 704 are all examples of computer storage medium. Additional types of computer storage medium that may be present include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 700 may also contain communications connection(s) 712 that allow processor 204 to communicate with servers, the user terminals, and/or other devices on a network. Communications connection(s) 712 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 700 may also include input device(s) 714 such as a keyboard, mouse, pen, voice input device, touch input device, etc., and output device(s) 716, such as a display, speakers, printer, etc. The system 700 may include a database hosted on the processor 204. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of click-through log mining for ads. For example, the methodological acts need not be performed in the order or combinations described herein, and may be performed in any combination of one or more acts.

What is claimed is:

1. A computing device implementing a user interface displayed on a screen, the computing device comprising:
   multiple virtual screens to define separate and distinct portions of content information;
   one or more navigation buttons to browse the separate and distinct portions of content information in the multiple virtual screens, the one or more navigation buttons being actuatable to browse the separate and distinct portions of content information displayed in a first virtual screen and the separate and distinct portion of content information displayed in a second virtual screen, such that actuation of a navigation button displays the separate and distinct portions of content information in the second virtual screen, while simultaneously no longer displaying the separate and distinct portions of content information in the first virtual screen;
   the one or more navigation buttons comprise being placed in a top location or a bottom location in each of the multiple virtual screens, the one or more navigation buttons being actuatable to browse the separate and distinct portions of content information in each of the multiple virtual screens in a vertical order;
   the one or more navigation buttons being actuated to browse the separate and distinct portions of content information in each of the multiple virtual screens in the vertical order; and
   a title bar to identify an hierarchical organization of the separate and distinct portions of content information in each of the multiple virtual screens, the hierarchical organization to include an overview to be displayed in a first virtual screen in the vertical order and related information to the overview to be displayed in a second virtual screen in the vertical order.

2. The computing device of claim 1, wherein the separate and distinct portions of content information comprise being reorganized to at least one of a root-level or a sub-layer.

3. The computing device of claim 1, further comprising a third virtual screen.

4. The computing device of claim 1, wherein the one or more navigation buttons comprising:
   facilitating forward and backward movements from the first virtual screen to the second virtual screen in response to a single actuation; and
   facilitating forward and backward movements from the second virtual screen to a third virtual screen in response to a single actuation.

5. The computing device of claim 1, wherein the one or more navigation buttons comprise being placed in a right side or a left side in each of the multiple virtual screens, the one or more navigation buttons being actuatable to browse the separate and distinct portions of content information in each of the multiple virtual screens in a horizontal order.

6. The computing device of claim 1, wherein the one or more navigation buttons comprise one or more arrows facilitating forward and backward movements from the first virtual screen to the second virtual screen in a direction indicated by the one or more arrows.

7. The computing device of claim 1, wherein the one or more navigation buttons being actuatable to facilitate movement among the multiple virtual screens comprising a right direction, a left direction, an upward direction, and a downward direction.

8. The computing device of claim 1, further comprising the multiple virtual screens to automatically adjust the content information in each of the multiple virtual screens in response, to the content information in a currently viewed virtual screen.

9. A method comprising:
presenting a user interface to view content information in one or more multiple virtual screens that defines separate and distinct portions of content information, the content information being configured to hold one or more types of related subject matter;
presenting one or more navigation buttons as part of the user interface to enable browsing the separate and distinct portions of content information in the multiple virtual screens, browsing the separate and distinct portions of content information displayed in a first virtual screen and browsing the separate and distinct portions of content information displayed in a second virtual screen, such that actuation of a navigation button displays the separate and distinct portions of content information in the second virtual screen, while simultaneously no longer displaying the separate and distinct portions of content information in the first virtual screen;
presenting the one or more navigation buttons in a top location or a bottom location of the multiple virtual screens, the one or more navigation buttons being actuatable to browse the separate and distinct portions of content information in each of the multiple virtual screens in a vertical order;
receiving actuation of the one or more navigation buttons to browse the separate and distinct portions of content information in each of the multiple virtual screens in the vertical order;
presenting the content information in a hierarchical organization with a title bar, the hierarchical organization to include an overview of the content information to be displayed in the first virtual screen in the vertical order and related information to the overview to be displayed in the second virtual screen in the vertical order; and
facilitating movement to and from the first virtual screen to the second virtual screen with the one or more navigation buttons.

10. The method of claim 9, further comprising reorganizing the content information into separate and distinct portions of related subject matter for each of the multiple virtual screens.

11. The method of claim 9, further comprising presenting the one or more navigation buttons on a right side or a left side of the multiple virtual screens, the one or more navigation buttons being actuatable to browse the content information in each of the multiple virtual screens in a horizontal order.

12. The method of claim 9, wherein the movement of the one or more navigation buttons occurs in response to a single actuation comprising at least one of a mouse click, a screen tap, a keyboard, a finger, a stylus, or a voice activation.

13. The method of claim 9, further comprising:
enabling movement from the first virtual screen to the second virtual screen when a navigation button on a right side of the first virtual screen is activated;
enabling movement from the second virtual screen to a third virtual screen when the navigation button on the right side of the second virtual screen is activated;
enabling movement from the third virtual screen to the second virtual screen when the navigation button on a left side of the third virtual screen is activated; and
enabling movement from the second virtual screen to the first virtual screen in response when a navigation button on the left side of the second virtual screen is activated.

14. One or more tangible computer storage media storing computer-executable instructions that, when executed, perform acts comprising:
presenting content information in one or more multiple virtual screens that defines separate and distinct portions of content information, the content information being configured to hold one or more types of related subject matter;
presenting one or more navigation buttons to facilitate navigation to enable browsing the separate and distinct portions of content information in the multiple virtual screens, browsing the separate and distinct portions of content information displayed in a first virtual screen and browsing the separate and distinct portions of content information displayed in a second virtual screen;
facilitating movement to and from the first virtual screen to the second virtual screen with the one or more navigation buttons, such that actuation of a navigation button displays the separate and distinct portions of content information in the second virtual screen, while simultaneously no longer displaying the separate and distinct portions of content information in the first virtual screen;
presenting the one or more navigation buttons in a top location or a bottom location of the multiple virtual screens, the one or more navigation buttons being actuatable to browse the separate and distinct portions of content information in each of the multiple virtual screens in a vertical order;
receiving actuation of the one or more navigation buttons to browse the separate and distinct portions of content information in each of the multiple virtual screens in the vertical order;
presenting an overview of the content information in a hierarchical organization with a title bar, the hierarchical organization to include an overview of the content information to be displayed in the first virtual screen in the vertical order and related information to the overview to be displayed in the second virtual screen in the vertical order.

15. The tangible computer storage media of claim 14, wherein the one or more navigation buttons comprise being actuatable to facilitate movement among the multiple virtual screens comprising at least one of a right direction, a left direction, an upward direction, or a downward direction.

* * * * *